Feb. 3, 1931.  G. WALKER  1,791,048
APPARATUS FOR REPRODUCING MOVEMENT
Filed Dec. 15, 1926   4 Sheets-Sheet 1

Inventor
George Walker

Feb. 3, 1931.   G. WALKER   1,791,048
APPARATUS FOR REPRODUCING MOVEMENT
Filed Dec. 15, 1926   4 Sheets-Sheet 2

Inventor
George Walker
By Roberts, Cushman & Woodbury
Attys.

Feb. 3, 1931.  G. WALKER  1,791,048
APPARATUS FOR REPRODUCING MOVEMENT
Filed Dec. 15, 1926  4 Sheets-Sheet 3
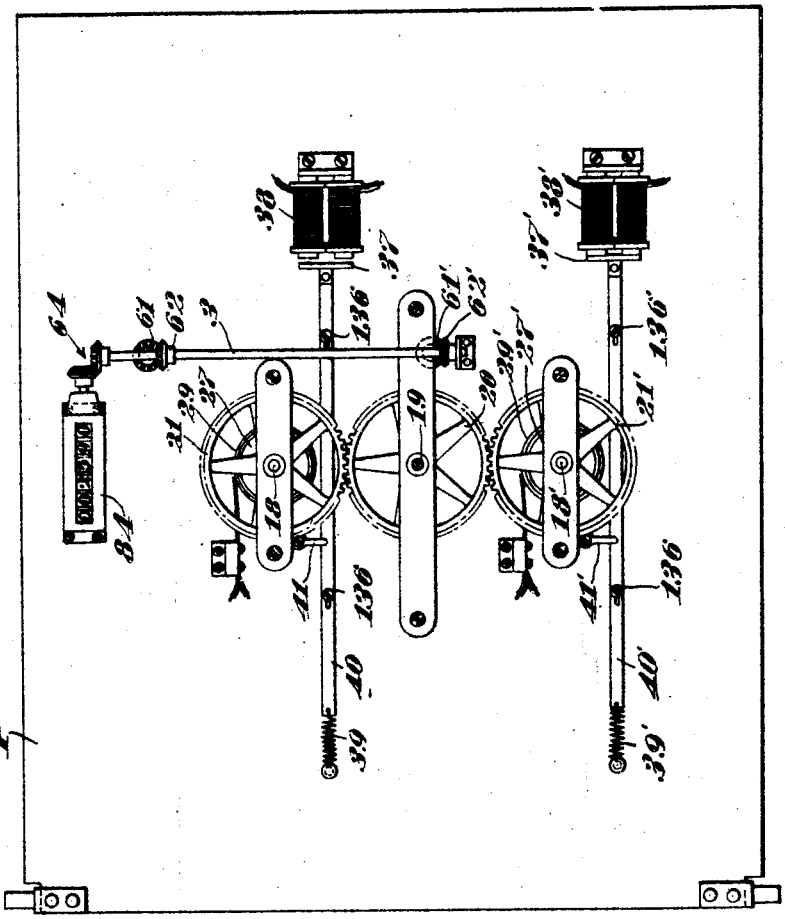
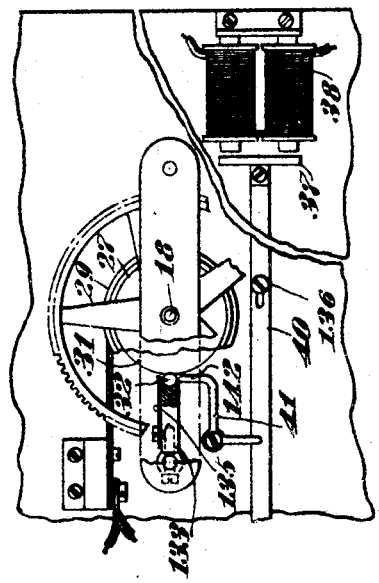
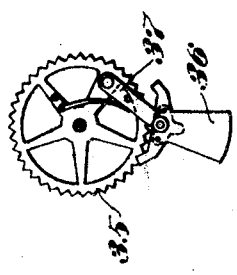
Inventor
George Walker
by Roberts, Cushman & Woodbury
Att'ys.

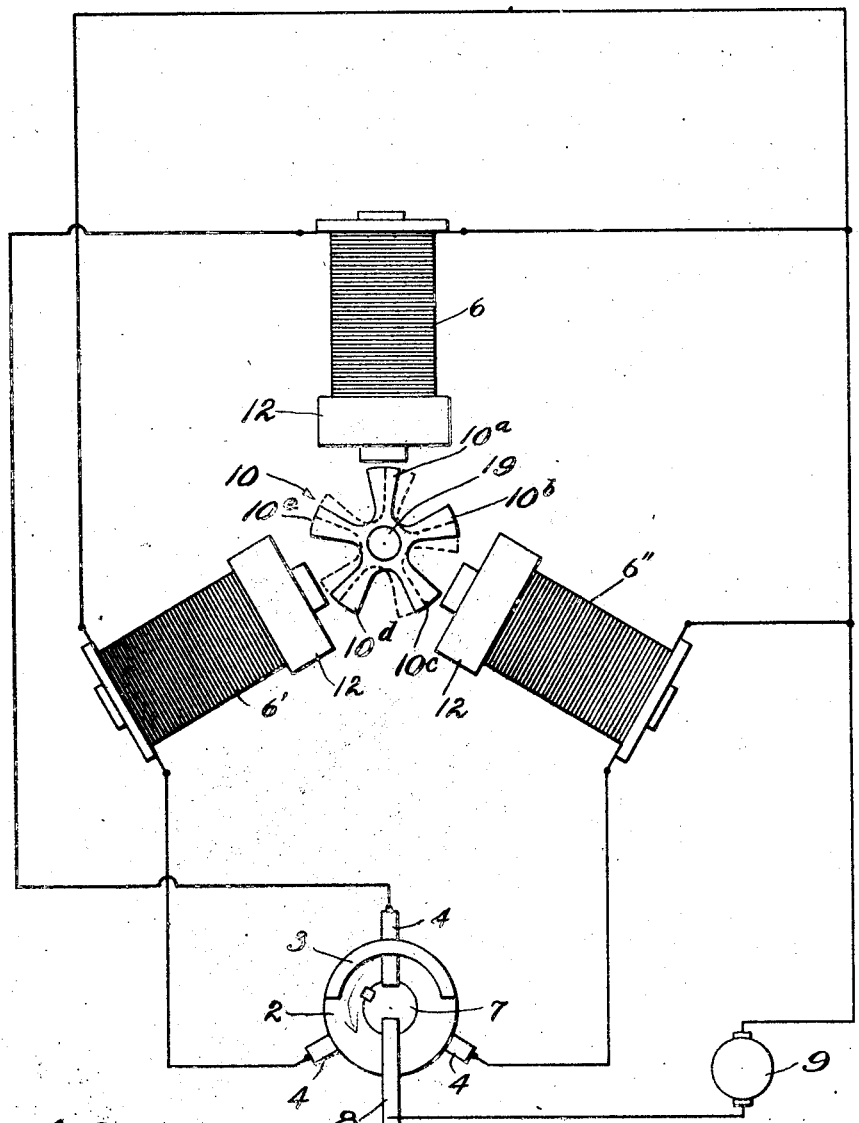

Patented Feb. 3, 1931

1,791,048

UNITED STATES PATENT OFFICE

GEORGE WALKER, OF NEWTON CENTER, MASSACHUSETTS

APPARATUS FOR REPRODUCING MOVEMENT

Application filed December 15, 1926. Serial No. 154,967.

This invention relates to distance indicating instruments for ships, aircraft and other bodies driven by a propeller (or propellers) moving in water, air or a similar fluid medium, wherein the distance travelled is not directly proportional to the propeller speed, the ratio between propeller speed and distance travelled varying more or less throughout the speed range of the ship depending upon various factors of the ship, propeller, and the fluid medium.

My prior Patents Nos. 1,638,970; 1,638,971; 1,738,807; and 1,638,973 disclose apparatus of this general character for automatically and continuously indicating the distance travelled in response to movement imparted to the body by a revolving propeller, (or propellers), notwithstanding variations in said ratio at different propeller speeds.

In general the apparatus disclosed in the above identified applications comprises oscillatory controllers advancing during alternate minutes or other periods of time for a distance proportional to the propeller speed, each controller being automatically returned to its initial position while the other controller is advancing. These controllers are designed in accordance with the varying ratio between ship and propeller speeds, and the distance indicator is continually being actuated by one or the other of the alternately moving controllers, accurately to register the distance travelled whether it be at constant or varying speed.

The present invention involves improvements in apparatus of this general character and more particularly obviates certain inaccuracies and errors which were likely to occur in the instruments shown in the above-identified patents. In instruments of the type previously disclosed, clutches are alternately actuated by the advancing controllers in order alternately to drive the distance registering mechanism, so that the latter is constantly being actuated either by one or the other of the controllers. These clutches are mechanical clutches of the ball type and while they permit a reasonable degree of accuracy and precision, I have discovered that for the extremely high degree of precision required in ships' instruments they tend to produce a slight inaccuracy or error in registering the distance traveled. Since driving of ships' instruments at a speed proportional to the propeller speed is usually effected by step-by-step electric motors, by toothed gears or similar elements, which do not produce exactly uniform torque, there is a tendency for the driving effect imparted to the mechanism to occur in a series of pulsations or impulses, or for secondary, oscillatory movements to be imposed upon the rotary movement. When mechanical clutches such as ball clutches are used, I have discovered that there is a tendency for these impulses as well as the momentum of the driven member itself to cause the latter to overrun or creep ahead of the driving member, the clutch construction preventing any secondary oscillation or movement of the driven member in the opposite direction which might partially compensate for this inaccuracy. In any instrument of the character described, wherein it is not feasible to provide smooth and uniform torque, overrunning clutches such as ball clutches, while considered extremely accurate for general purposes, tend to set up a cumulative error which results in considerable inaccuracy if the instrument operates for any considerable length of time; thus in a ship's instrument employing ball clutches there would be an appreciable inaccuracy in the reading of the distance indicator at the end of a fairly long journey.

In its more specific aspect the present invention is therefore designed to obviate such inaccuracies by a new arrangement of parts substituting properly regulated magnetic clutches for mechanical clutches in mechanisms of this character, each magnetic clutch preferably being energized by an electrical current which also governs the alternating oscillatory movement of the corresponding controller; it having been found by experiment that magnetic clutches of the type disclosed herein are adapted to permit a singularly accurate movement of the driven member and accurate registration of the distance travelled. While clutches of this character are energized the driving and driven members are substantially locked together and over-running of the latter is prevented, or, in other words, the movement of the driving member, including any secondary oscillatory movement or variation in torque, is accurately repeated in the driven member.

For purposes of illustration, one concrete form of the invention is disclosed in the accompanying drawings in which:

Fig. 5 is a broken elevational view of a portion of the mechanism;

Fig. 6 is an elevational view of an escapement mechanism which is associated with the instrument;

Fig. 7 is an elevational view of the opposite face of the hinged plate disclosed in Fig. 1, with various parts of the instrument assembled thereon; and Fig. 8 is a diagrammatic view of step-by-step mechanism for driving the instrument.

Figure 1:
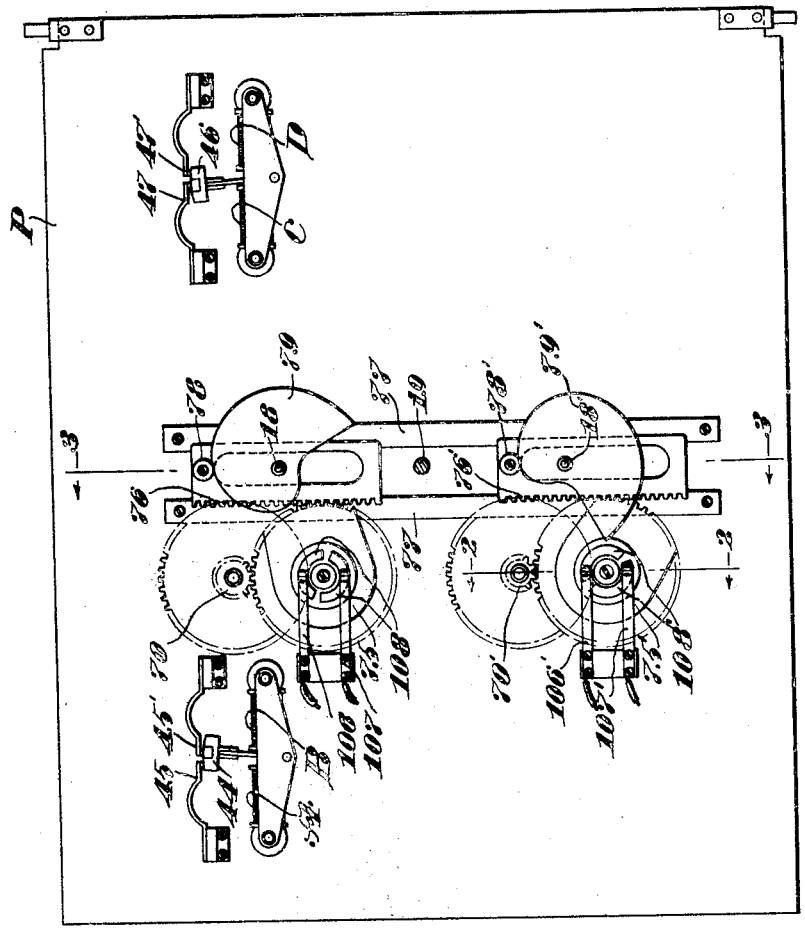
Fig. 1 is a rear elevational view of a portion of the instrument assembly which is supported upon a hinged plate normally located in the instrument casing.

An instrument of the type disclosed herein may preferably be provided with a pivoted plate P, which is designed to hold the major component units of the instrument and which in its normal position is preferably located parallel to and behind the face 1 of the instrument casing, (Fig. 3), the latter being provided with suitable dials and an opening for observation of the distance register.

An instrument of this character may be driven in any suitable manner by a member having a speed proportional to that of a propeller or to the average speed of several propellers, such driving effect being imparted thereto by means of a step-by-step motor or motors, or any similar well-known mechanism.

One manner of driving the apparatus by means of a step-by-step motor is diagrammatically illustrated in Fig. 8. The shaft 19 is to be driven at a rate proportional to the propeller speed, while the member 7 may represent the propeller shaft, or a part geared to the same and moving at a speed proportional to that of the propeller shaft or to the mean speed of a plurality of propeller shafts. Keyed to the shaft 7 is a disk 2 of insulating material carrying a contact segment 3 which is adapted to contact successively with a plurality of brushes 4. These brushes 4 are respectively connected by suitable leads with magnets 6, 6' and 6" of the step-by-step motor; contact 8, which bears upon shaft 7, being connected to any suitable source 9 of electric energy in order to conduct current to the various magnets in succession, these magnets being connected by return leads with the current source 9.

Either mounted upon shaft 19 or geared thereto, is the armature 10 provided with a series of poles $10^a$, $10^b$, $10^c$, $10^d$, $10^e$, which preferably differ in number from the number of magnets and have an angular spacing which is not divisible by or into the angle of spacing of the magnets. The magnets are preferably provided with suitable short-circuited rings of metal 12 so that they may be rendered slow acting, or, in other words, so that closing of the electrical circuits controlling the magnets results in gradual energization of the same and so that opening of the electric circuits results in gradual de-energization of the same. Preferably the segment 3 is so dimensioned that it will contact with a succeeding brush before it has broken the contact with the preceding brush. Thus in the full-line position shown, magnet 6 is being energized, while, as the shaft 7 rotates, the segment 3 contacts with the brush which controls energization of magnet 6' while magnet 6 continues to be energized. Magnet 6' will therefore tend to attract pole $10^d$ while magnet 6 still acts as a brake upon pole $10^a$, thus resulting in the movement of the armature to the dotted line position. Continued rotation of the shaft 7 will result in the de-energization of magnet 6 and the movement of the armature to a position wherein the pole $10^d$ is in direct concentric alignment with magnet 6'. Thus it is evident that movement is imparted to the shaft 19 in a series of gradual pulsations resulting from the overlapping periods of energization of successive magnets; these operations taking place gradually due to the slow acting design of the magnets, as more specifically disclosed in my copending application Serial No. 154,966 filed on even date herewith.

While the principles of the invention are applicable to an instrument adapted to register in response to the movement of a series of propellers; for purposes of simplicity, and, since the inventive principles involved are the same, the present disclosure shows an instrument especially adapted for use with a ship or other body driven by a single propeller.

As disclosed herein, movement may be thus imparted to the instrument through the main shaft 19 at a rate proportional to the propeller speed. Fixed upon the shaft 19 is a gear 20 (Fig. 3) meshing with gears 21 and 21' respectively. The latter are preferably in concentric alignment with oscillatory controllers 79—79', upon shafts 18—18' which are alternately actuated in order continually to drive the distance indicating mechanism. Preferably gears 21—21' are provided with hubs 98—98', through which shafts 18 and 18' extend. Secured to gears 21—21' are the circular magnets 27—27' which are adapted to attract the disk armatures 28—28' upon shafts 18—18'. The magnets may be energized through slip rings 29—29' at controlled intervals in a manner which will presently be described, in order alternately to cause the rotation of either shaft 18 or shaft 18' in response to the continuous rotation of gear 20. Suitable coil springs 33—33' are adapted to cause shafts 18—18' to return to normal position when magnets 27—27' are de-energized.

The escapement mechanisms 34—34' are provided to cause such a return movement to take place gradually without undue shock, vibration and noise. As shown in Fig. 6, the escapement mechanism comprises a notched wheel 35, an escapement lever 36 and a spring pressed pawl 37. The rocking of member 36 permits gradual rotation of member 35, whereby the shaft 18 and 18' and members carried thereon may be returned to their reset position gradually rather than abruptly.

Preferably shafts 18—18' extend through front panel 1 of the instrument and are provided with indicator hands 13—13', which are alternately advanced in order to show the propeller R. P. M. during the preceding minute or other period of time. Before return to their reset position the shafts 18—18' are therefore preferably held in their advanced positions for a portion of the minute while the other shaft is advancing. For this purpose as shown in Figs. 5 and 7, shafts 18—18' carry disks 31—31' which may be locked against rotation in a reverse direction in response to springs 33—33' by means of balls 32—32' (Fig. 5) which rest between inclined holders 133—133' and the peripheries of disks 31—31'. Normally the ball tends to be wedged between the holder and the periphery of the disk to lock the latter against rotation in the direction indicated, springs 135—135' cooperating with gravity to retain the balls in their normal position. The horizontally reciprocable rods 40—40' have their movement limited by screws 136 engaging slots therein, the rods being normally drawn toward the left as shown in Fig. 7 by the tension springs 39—39', while suitable electromagnets 38—38' are adapted to attract armatures 37—37' upon the ends of the rods in order to expand springs 39—39'. Ball 32, for example, may thus be lifted upwardly to release the member 31, thereby permitting rotation of the shaft 18 in a reverse direction; such a result being obtained by the use of the bell-crank 41 with an angular arm 142 engaging the ball and its opposite arm pivoted to the horizontally reciprocable rod 40. Thus it may be seen that when the rod 40 is moved in one direction, for example, when the magnet 38 is energized, the member 41 will be rocked to lift the ball 32 in order to permit free rotation of the shaft 18 and parts fixed thereto.

Fixed upon the shaft 18—18' are the controller members 79—79', which are shaped in accordance with the ratio between the propeller speed and speed of the ship or other body propelled. As shown herein the controllers are in the form of cams, the peripheries of which are ground in accordance with the said ratio, which preferably is determined experimentally for each individual installation. Cams 79—79' being fixed to the shafts 18—18' are adapted to oscillate therewith in accordance with the movement imparted thereto by magnets 27—27'. Preferably the followers 78—78' resting upon cams 79—79' respectively, are slidable in guides 77 so that each follower is lifted an amount corresponding to the distance the ship or similar body is moved during the minute or other periods of time in which the cam is being advanced, (Fig. 1).

Figure 2:
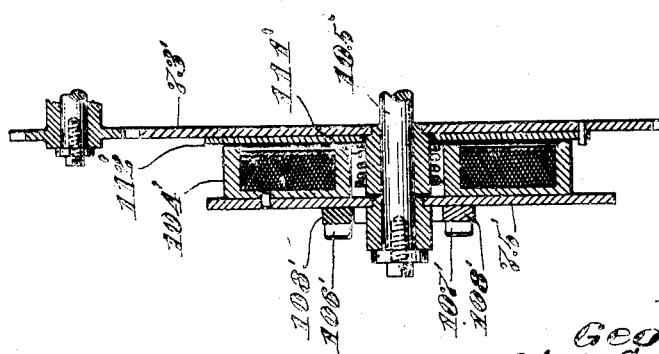
Fig. 2 is a sectional view on line 2—2 of Fig. 1 illustrating the improved form of clutch.

Followers 78—78' are provided with toothed edge portions 76—76' in the form of racks which are adapted to engage gear segments 75—75', which are provided with electromagnets 104—104', (Fig. 2). Brushes 106—106' and 107—107' engage contact segments 108—108' upon the face of the segments 75—75' in order to energize magnets 104—104'. The segments and magnets 104—104' revolve about fixed studs 105—105' (Fig. 2) upon which gears 73—73' are also pivotally mounted. Preferably spring 111' tends to maintain a slight clearance between the magnet 104' and the disk armature 112' which is secured to gear 73' so that when the magnet is not energized the gear and the segment are adapted freely to move in relation to each other. Gears 73—73' are adapted to actuate pinions 70—70' respectively; these pinions in turn drive beveled gears 61—61' (Fig. 3) meshing with gears 62—62' upon the vertical shaft 3 which may be connected by any suitable means as by the gears 64 with distance indicator 84.

Figures 3, 4:
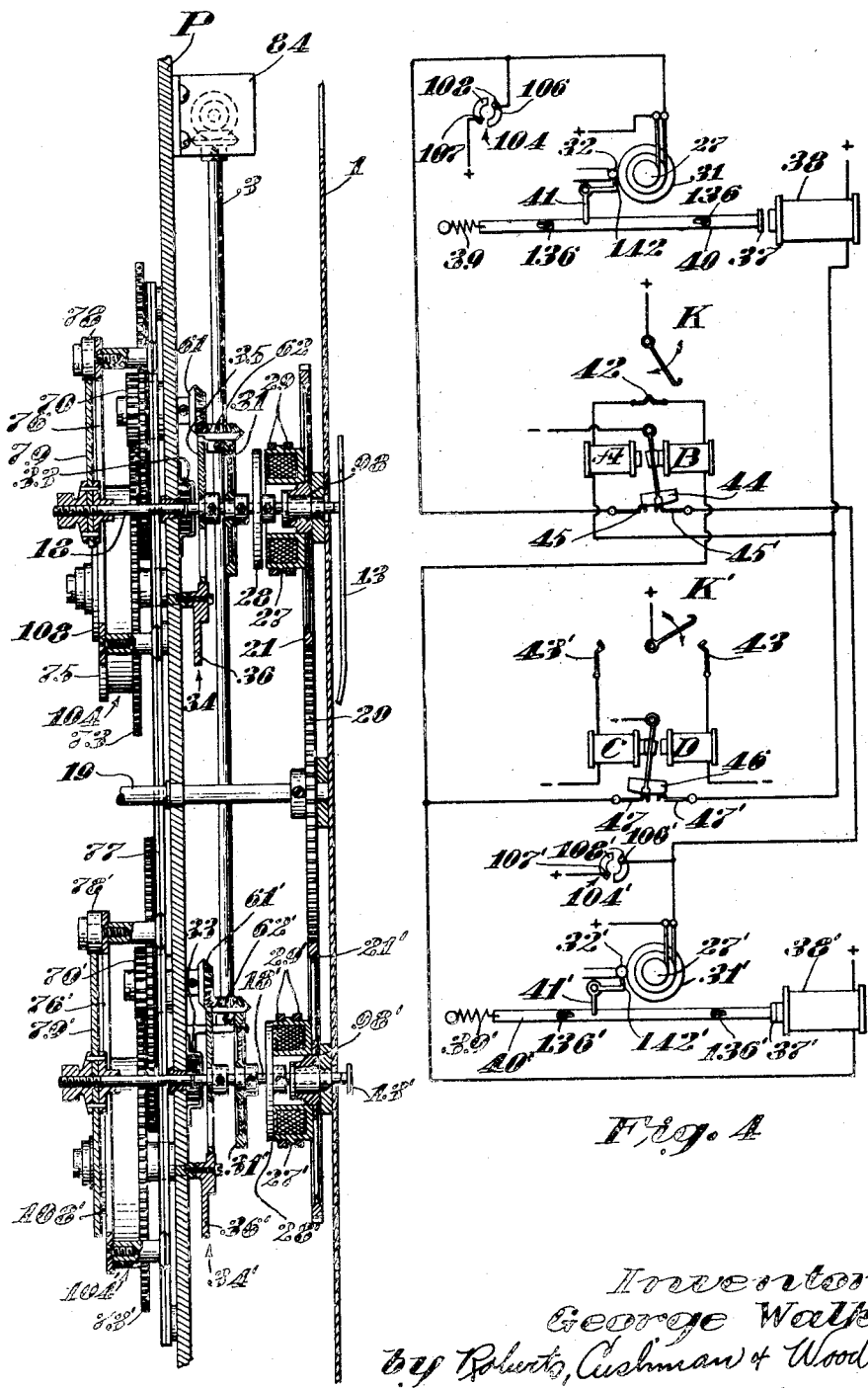
Fig. 3 is a section on line 3—3 of Fig. 1.
Fig. 4 is a diagrammatic view, illustrating electrical connections.

The general mode of operation of an instrument of this character may be best understood with reference to the diagrammatical view of Fig. 4 wherein certain of the mechanical parts are schematically illustrated. It is to be understood that the alternate movement of the various elements of the instrument is effected by chronometrically controlled electric switches, which are preferably located without the instrument proper and are only diagrammatically indicated at K and K', Fig. 4. During the operation of the instrument, electric control element K engages a suitable contact 42 once each minute while element K' engages a contact at 43 or 43' just before the ends of alternate minutes. With the parts in the position shown, the lower magnet 27' is energized through contact 45' thus causing the lower indicator 13' to advance in response to the rotation of the shaft 19, the upper indicator 13 being held in the position to which it was advanced in the preceding minute by ball 32.

Just before the expiration of the current minute switch element K' engages contact 43 to energize magnet D and throws armature 46 to the right which (1) energizes magnet 38 through switch 47' to release ball 32 to permit the upper indicator to reset due to the action of spring 33, (2) opens the circuit of magnet 38' at 47 to permit spring 39' to retract bell crank 41', thereby permitting ball 32' to return to operative position, and (3) conditions the circuit of magnet A. At the expiration of the minute switch K engages contact 42 to energize magnet A and throw armature 44 to the left, which (1) closes the circuit to magnet 27 through switch 45 to start the upper indicator 13, (2) similarly closes the circuit to magnet 104 to cause the upper cam 79 to drive the distance register, and (3) opens the circuits of magnets 27' and 104' simultaneously to stop the lower indicator 13' and terminate actuation of the distance register through the lower cam 79'. Near the end of the next minute switch element K' engages contact 43' to energize magnet C and throw armature 46 to the left which (1) energizes magnet 38' through switch 47 to release ball 32' to permit the lower indicator 13' to reset (2) opens the circuit of magnet 38 at 47' to permit spring 39 to retract bell crank 41, thereby permitting ball 32 to drop to its operative position and (3) conditions the circuit of magnet B. At the end of this minute, switch K again engages contact 42 to energize magnet B and throw armature 44 to the right, which (1) closes the circuit to magnet 27' through switch 45' to start the lower indicator 13', (2) similarly closes the circuit to magnet 104' to cause the distance register to be driven by the lower cam 79' and (3) simultaneously opens the circuits of magnets 27 and 104 to stop the upper indicator 13 and terminate actuation of the distance register by the upper cam 79. Thus the upper and lower indicators and cams are alternately advanced, held in advanced position, and reset to initial condition during alternate periods of time.

Energization of the electromagnets 27 and 104, 27' and 104' in parallel permits an extremely accurate transmission of the movement of the followers 78—78' to the distance measuring mechanism without any tendency of the driven members of the clutch to overrun. Thus very accurate control of the movement of the shaft 3 is permitted and registration of the distance actually covered by the ship is permitted, although the ratio between propeller speed and ship speed may have varied widely at different parts of the journey.

I claim:

1. Apparatus for measuring the distance traveled by a body driven by a propeller reacting upon a fluid medium, comprising means for producing impulses at a rate proportional to the speed of the propeller, alternately acting means responsive to said impulses to actuate a distance indicator according to the distance traveled by the body whether at constant or varying speed, means including magnetic clutches for alternately establishing operative relation between said first means and said indicator, and means for periodically energizing said magnetic means at predetermined intervals.

2. Apparatus for measuring the distance traveled by a body driven by a propeller reacting upon a fluid medium, comprising a driving member with a pulsating rotary movement at a rate proportional to the propeller speed, a distance indicator, alternately acting elements responsive to the movement of said driving member to actuate the indicator according to the distance traveled whether at constant or varying speed, electromagnetic clutches for alternately establishing operative relation between said elements and said indicator.

3. Apparatus for measuring the distance traveled by a body driven by a propeller reacting upon a fluid medium, comprising a driving member with a pulsating rotary movement at a rate proportional to the propeller speed, a distance indicator, elements alternately advanced in response to the movement of said driving member to actuate the indicator according to the distance traveled whether at constant or varying speed, and electromagnetic clutches energizable only during the advance movement of the corresponding element for alternately establishing an operative connection between said elements and said indicator.

4. Apparatus for measuring the distance traveled by a body driven by a propeller reacting upon a fluid medium, comprising a driving member with a pulsating rotary movement at a rate proportional to the propeller speed, a distance indicator, elements alternately advanced in response to the movement of said driving member to actuate the indicator according to the distance traveled whether at constant or varying speed, each of said elements being reset to initial position while the other element is advancing, and electromagnetic clutches energizable only during the advance movement of the corresponding element for alternately establishing an operative connection between said elements and said indicator, and for permitting the resetting of an advanced element without affecting actuation of the indicator.

5. Apparatus for measuring the distance traveled by a body driven by a propeller reacting upon a fluid medium, comprising a driving member with a pulsating rotary movement at a rate proportional to the propeller speed, a distance indicator, elements alternately advanced in response to the movement of said driving member to actuate the indicator according to the distance traveled whether at constant or varying speed, said elements including controllers shaped to correspond to the ratio between the speed of the body and the propeller, each of said elements being reset to initial position while the other element is advancing, and electromagnetic clutches energizable only during the advance movement of the corresponding element for alternately establishing an operative connection between said elements and said indicator, and for permitting one controller to return to reset position while the other controller is advancing without affecting actuation of the indicator.

6. Apparatus for measuring the distance traveled by a body driven by a propeller reacting upon a fluid medium, comprising a driving member with a pulsating rotary movement at a rate proportional to the propeller speed, a distance indicator, elements alternately advanced in response to the movement of said driving member to actuate the indicator according to the distance traveled whether at constant or varying speed, said elements being alternately connected to the driving member by electromagnetic means, and electromagnetic clutches for alternately establishing an operative connection between said elements and said indicators, said clutches being energizable in synchronism with the electromagnetic means whereby a driving connection is provided between an element and the indicator only while the former is advancing and continued movement of the indicator is permitted while the element is not advancing.

7. Apparatus for measuring the distance traveled by a propeller-driven body, comprising a driving member with a pulsating movement proportional to the propeller speed, mechanism operated by said member, comprising a pair of alternately advancing controller elements designed in accordance with the varying ratio between the propeller and ship's speed, and electromagnetic clutches associated with each of the controller elements and arranged so that the driving members thereof are rotated thereby an amount corresponding to the ship's speed during the period of advance of the corresponding controller, the driven members being operatively connected to the distance register.

8. Apparatus for measuring the distance traveled by a propeller-driven body, comprising a driving member with a pulsating movement proportional to the propeller speed, clutches driven by said member, said clutches comprising electromagnets, the energization of which results in movement of the driven members of the clutch, the latter each being operatively connected to a controller designed in accordance with a determined factor, such as the variable ratio between ship and propeller speed, said controllers each being associated with the driving member of another electromagnetic clutch in order to move the same in accordance with the movement of the corresponding first-named clutch which is operatively connected thereto as determined by the controller, the driven members of said second-named clutches being connected to a common mechanism such as a distance register, which is alternately driven by first one and then the other thereof, said electromagnets in each pair of operatively connected clutches being simultaneously energized and de-energized, whereby the driven member of the first clutch and driving member of the second clutch of each pair may be reset, while movement of the corresponding driving and driven members thereof may be continuous.

Signed by me at Boston, Massachusetts, this 27th day of November, 1926.

GEORGE WALKER.